United States Patent [19]

Chao

[11] Patent Number: 5,313,579
[45] Date of Patent: May 17, 1994

[54] B-ISDN SEQUENCER CHIP DEVICE

[75] Inventor: Hung-Hsiang J. Chao, Lincroft, N.J.

[73] Assignee: Bell Communications Research, Inc., Livingston, N.J.

[21] Appl. No.: 893,266

[22] Filed: Jun. 4, 1992

[51] Int. Cl.⁵ .............................................. G06F 13/00
[52] U.S. Cl. ...................................... 395/200; 370/60; 370/94.1
[58] Field of Search .................... 370/60, 112, 94.1; 395/200; 364/725, 786

[56] References Cited

U.S. PATENT DOCUMENTS 5,166,926 11/1992 Cisneros et al. ..................... 370/60
5,197,021 3/1993 Cucchi et al. ....................... 364/725

OTHER PUBLICATIONS

L. Zhang, "VirtualClock: A new traffic control algorithm for packet switching networks," in Proc. SIGCOMM '90, Philadelphia, Pa. Sep. 1990, pp. 19-29.

J. S. Turner, "New directions in communications (or which way to the information age?)" IEEE Commun. Mag., vol. 24, No. 10, pp. 8-15, Oct. 1986.

Primary Examiner—Arthur G. Evans
Assistant Examiner—Gaurav Bhatia
Attorney, Agent, or Firm—Leonard Charles Suchyta

[57] ABSTRACT

A sequencer chip device, provided for use in a broadband integrated service digital network (B-ISDN), is particularly adapted to control users' traffic at two places in the network: at the user-network interface (UNI) by a traffic enforcer, and at the network-node surface interface (NNI) by a queue manager. The traffic enforcer contains a buffer to delay and reshape violating cells that do not comply with some agreed-upon traffic parameters. The queue manager manages cells in a queue at network nodes in such a way that higher priority cells are always served first, low priority cells are discarded when the queue is full, and any interference between same-priority cells is prevented. Proposed architectures for the traffic enforcer and the queue manager include the chip device. The chip device includes a plurality of modules each of which is divided into three main functional areas: controller, memory and comparator. The chip device is preferably implemented using 1.2 μm CMOS technology.

11 Claims, 8 Drawing Sheets

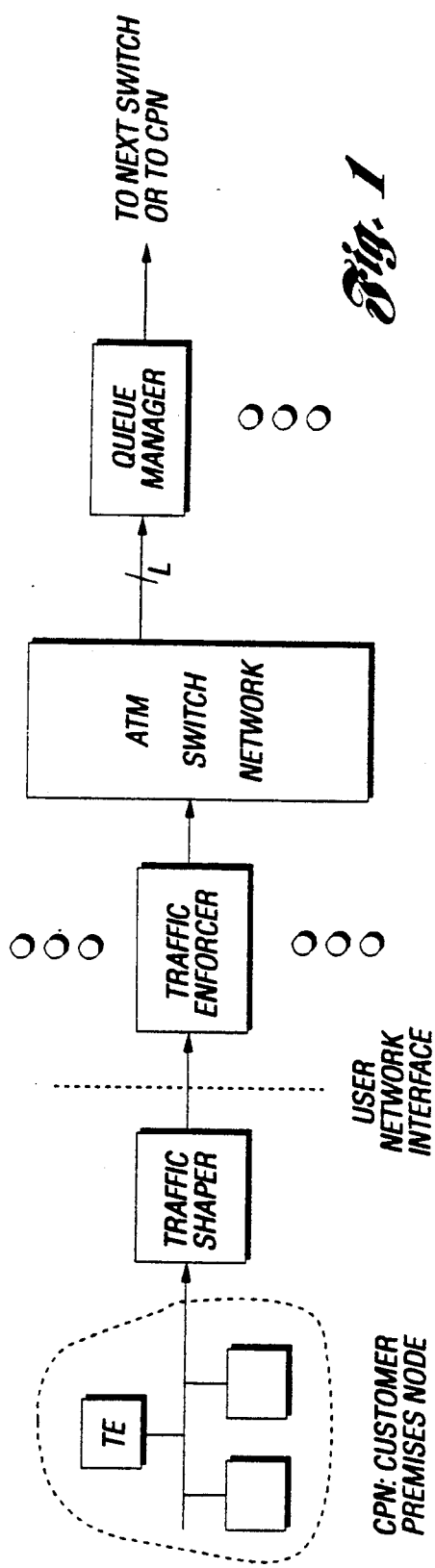
Fig. 1
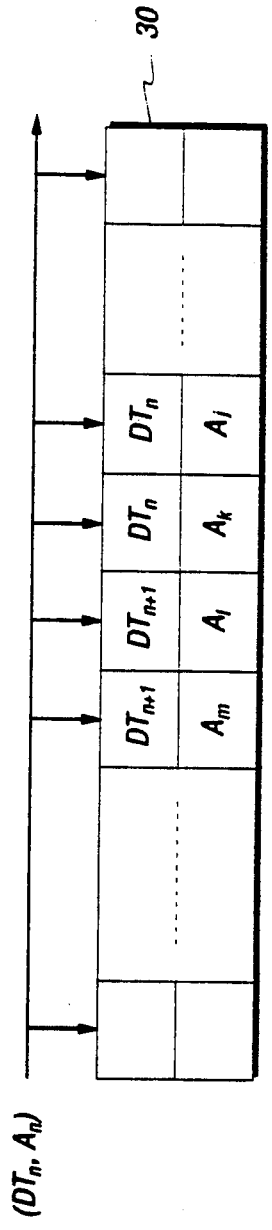
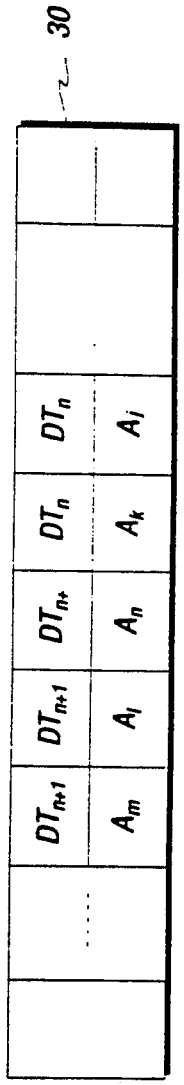
Fig. 4

TDM: TIME DIVISION MULTIPLEXER

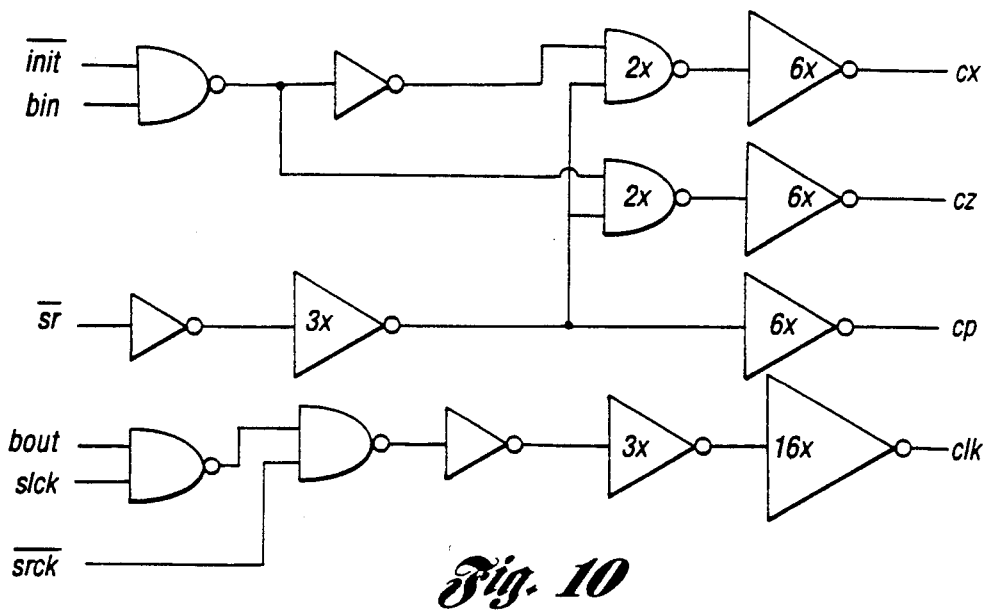
Fig. 10
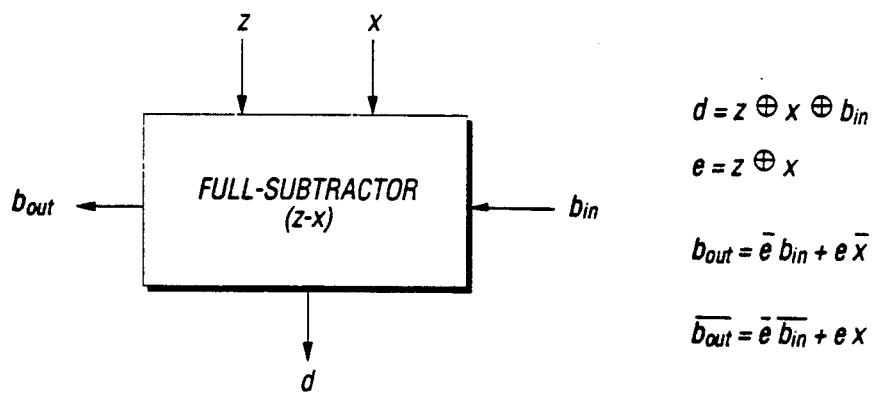
$d = z \oplus x \oplus b_{in}$
$e = z \oplus x$
$b_{out} = \bar{e}\, b_{in} + e\, \bar{x}$
$\overline{b_{out}} = \bar{e}\, \overline{b_{in}} + e\, x$
Fig. 11
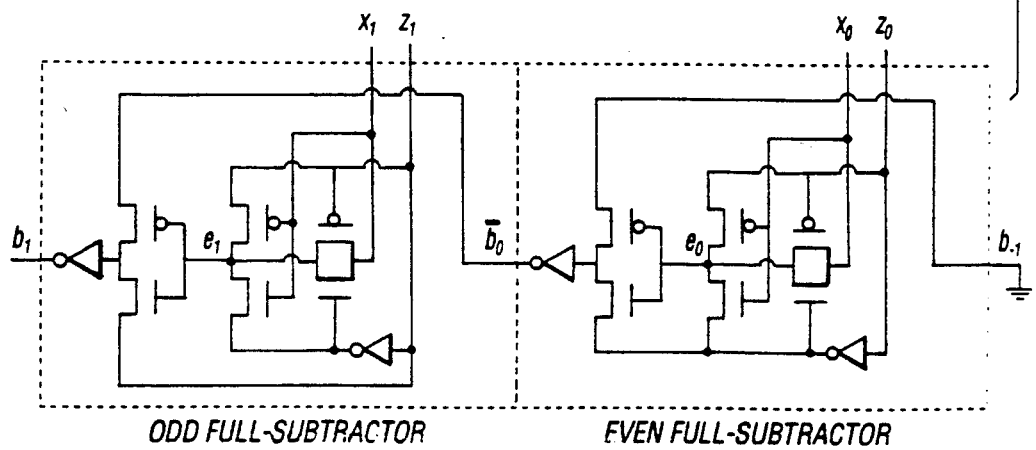

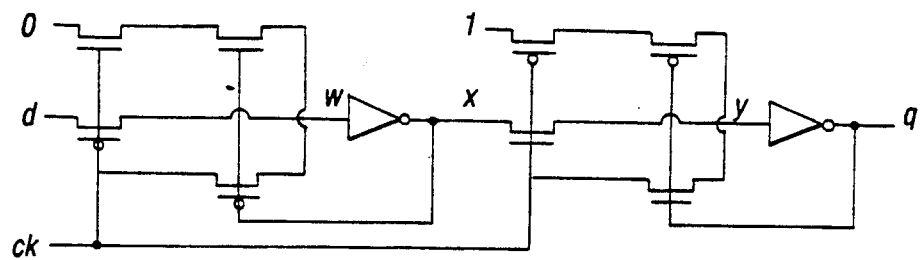
Fig. 12a) DFF1
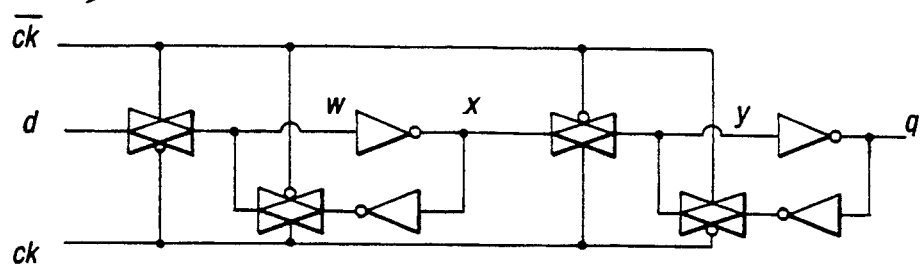
Fig. 12b) DFF2
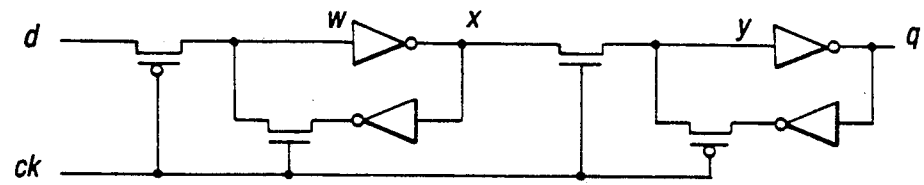
Fig. 12c) DFF3
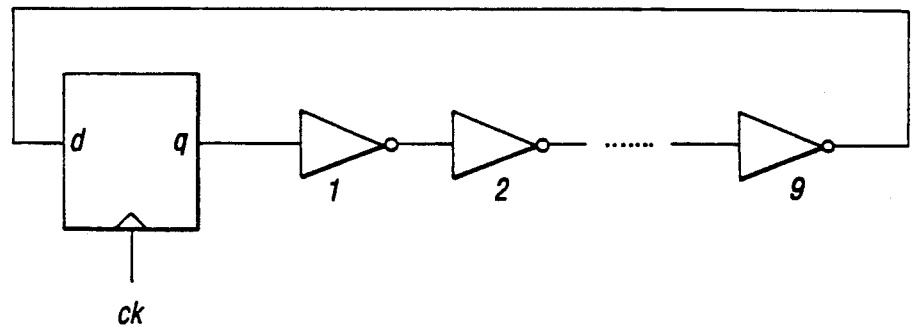
Fig. 13

B-ISDN SEQUENCER CHIP DEVICE

CROSS-REFERENCE TO RELATED APPLICATIONS

This application is related to U.S. patent applications entitled-"Method and System for Managing Queued Cells" U.S. Ser. No. 07/893,265 and "Method and System for Controlling User Traffic to a Fast Packet Switching System" U.S. Ser. No. 07/893,274 both of which are filed on the same day as the present application, by the present assignee, and both of which are hereby expressly incorporated by reference in their entirety.

TECHNICAL FIELD

This invention relates to sequencer chip devices, and in particular, to sequencer chip devices for use in broadband integrated service digital networks.

BACKGROUND ART

Broadband integrated service digital networks (B-ISDN) will provide end-to-end transport for a wide range of broadband services in a flexible and efficient manner via the asynchronous transfer mode (ATM) technique. The ATM technique provides a standardized and flexible scheme to transport and switch traffic effectively for different services. Due to the natural burstiness of the broadband traffic (e.g. data file transfer and variable bit-rate video communication), congestion control is required to effectively and fairly allocate the shared network resources (e.g., transmission bandwidth and buffer capacity) so that satisfactory quality of service (QOS) to all network users can be provided. Congestion in the ATM network arises when the offered load exceeds the capacity of the network. A suitable set of congestion controls for ATM networks includes admission control, traffic enforcement, queue management, and reactive flow control.

The function of admission control is to decide whether a new virtual channel connection should be admitted to the network (or rejected) based on the knowledge of the current network status (e.g., loading and available resources), the connection's traffic descriptor (including parameters such as average and peak bit rates, and maximum burst lengths), and performance objectives (such as cell loss probability, cell transfer delay, and cell delay variation). A new connection will be admitted only if the QOS can be met and the service quality of calls in progress will not be affected. Several schemes for the call admission control have been proposed.

Reactive flow control alleviates the instantaneous overload condition in the network so that the cell loss in the network is reduced and the users' QOS is maintained. Two reactive flow control schemes have been suggested: backward congestion notification (BCN) and forward congestion indication (FCI). For both schemes the source terminal is, either directly or indirectly, informed by the network to adjust its data rate when the network is congested. However, because of the large product of the transmission bandwidth and the round-trip delay, many cells will still be in transit between the source terminal and the congested node, and may be lost by the time the source terminal receives the congestion information and starts to regulate its traffic flow.

A traffic enforcer, as shown in FIG. 1, monitors (or polices) each virtual connection to ensure that its traffic flow into the network conforms to the traffic descriptor, which could be specified at call setup. If the user's traffic does not conform to the traffic descriptor, some action has to be taken against the violating traffic. For instance, the violating cells could be dropped, temporarily stored in a reshaping buffer, or transmitted to the network anyway, but with the cells tagged with a lower priority. The last option implies that some sort of priority mechanism has to be implemented within the network.

A traffic enforcement scheme that has a buffer to delay and reshape the violating cells is disclosed in the above-noted U.S. patent application entitled "Method and System for Controlling Packet Access to a Packet Switching System." If the buffer is full, some cells are transmitted to the network but are tagged with a lower priority. A novel architecture to implement the traffic enforcer or a traffic shaper at the customer premises is also disclosed. This architecture is capable of performing the traffic enforcement for a large number of virtual channels (e.g., a few thousand) on each input line.

Since a future network node will have to deal with traffic having different requirements, the use of multiple priorities and switch control functions serves as a possibility for distinguishing among different traffic types. A queue manager as shown in FIG. 1 manages the queued cells in a network node in such a way that higher priority cells are always served first, low priority cells are discarded when the queue is full, and any interference between same-priority cells is prevented. By assigning a departure sequence number to every cell, the effect of long-burst traffic on other cells is avoided. An architecture to implement the queue manager using a mechanism called VirtualClock is disclosed in the above-noted U.S. patent application entitled "Method and System for Managing Queued Cells." The architecture has the capability to support thousands of priority levels.

An object of the present invention is to provide a sequencer chip device for use in a system which performs traffic enforcement for a large number of virtual channels on each input line.

Another object of the present invention is to provide a sequencer chip device for use in a system which manages queued cells in a network node in such a way that higher priority cells are always served first, low priority cells are discarded when the queue is full and any interference between same priority cells is prevented.

In carrying out the above objects and other objects of the present invention, a sequencer chip device for use in a broadband integrated service digital network is provided wherein users' traffic in the form of ATM cells is controlled. The device includes a plurality of modules connected in series for receiving data related to the ATM cells and means for broadcasting new data related to a new ATM cell received by the device to each of the modules in a write-in mode of the chip device. Each of the modules includes memory means for storing prior data related to a previously received ATM cell, and means for comparing the new data with the prior data to obtain a comparison signal. Each of the modules also includes controller means coupled to its respective memory means and means for comparing for alternately retaining the stored prior data or replacing the stored prior data with the new data or with prior data from an immediately adjacent memory means based on the comparison signal of its means for comparing and the comparison signal of the immediately adjacent means for comparing.

Preferably, the device is a single VLSI chip. Also preferably, the chip is a word sorting memory chip.

The above objects and other objects, features, and advantages of the present invention are readily apparent from the following detailed description of the best mode for carrying out the invention when taken in connection with the accompanying drawings.

FIG. 1 is a block diagram illustrating how users' traffic is controlled at two places in an ATM network;

FIG. 4 is a block diagram illustrating how a new arrival is inserted into the sequencer chip device of the present invention;

FIG. 10 is a circuit diagram of a controller of the device;

FIG. 11 is a circuit diagram of a subtractor of the device;

FIGS. 12a, 12b and 12c illustrate three different circuits for a static, D-type flip-flop of the device; and FIG. 13 is a test circuit for comparing the three different DFFs' speed.

BEST MODE FOR CARRYING OUT THE INVENTION

To implement the traffic enforcer/shaper and the queue manager, there is applied herein the concepts of fully distributed and highly parallel processing to schedule the sending sequence or discarding sequence of ATM cells. A sequencer chip device preferably contains about 150k CMOS transistors and is implemented in a regular structure so that the number of virtual channels or priority levels can grow flexibly. The architectures for the traffic enforcer/shaper and the queue manager are described herein. A detailed design of the sequencer chip device is described and a conclusion is also provided.

Traffic Enforcer/Shaper

Figure 2:
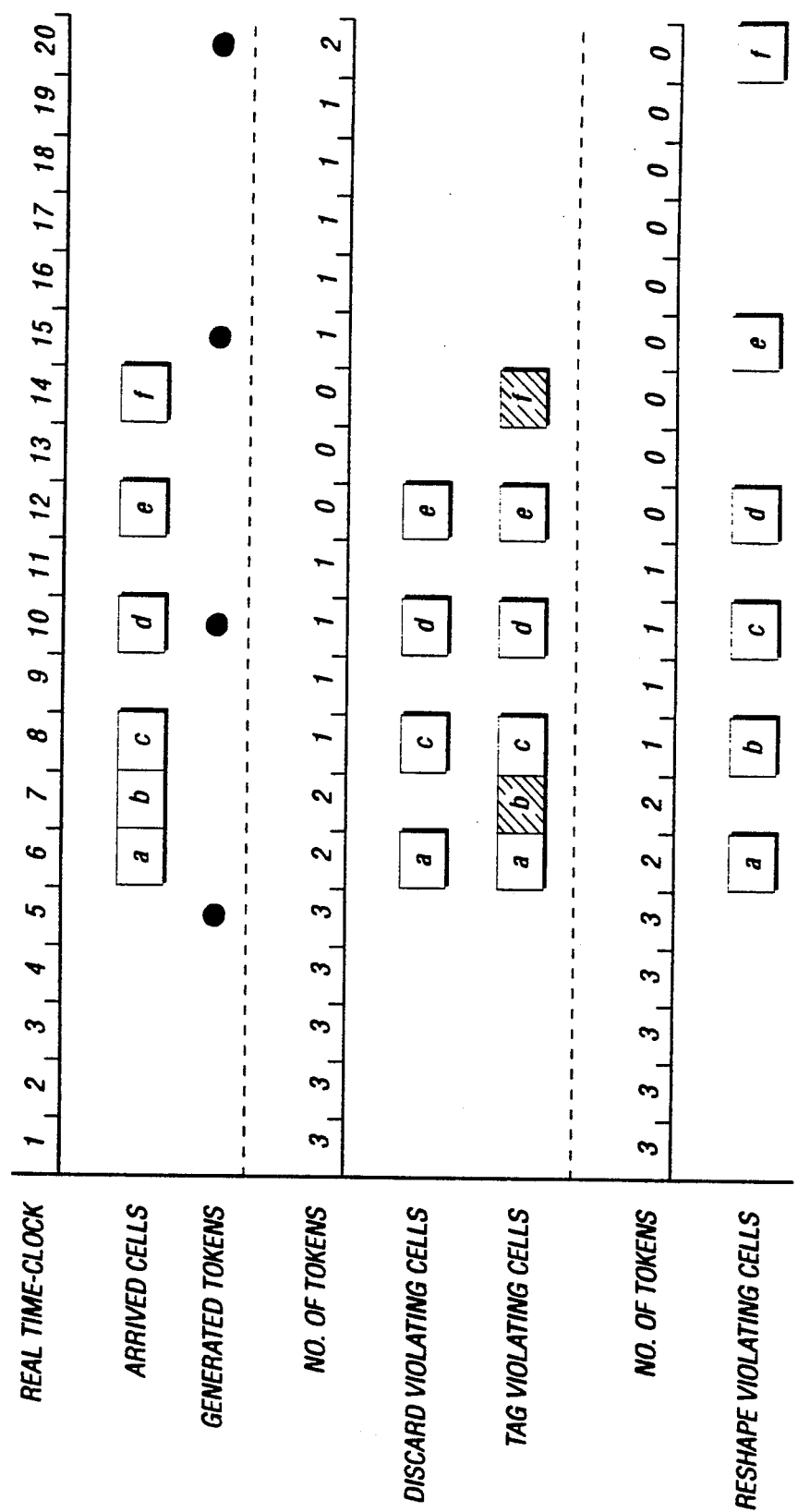
FIG. 2 is a graph illustrating three different actions to the violated cells: discarding, tagging, and reshaping.

FIG. 2 illustrates an example showing three different actions applied to the violating cells: discarding, tagging, and reshaping them by delaying (as described herein). Whether or not the incoming cell can immediately be sent out usually depends on its current "token" count (or credit). The token count can be, for example, incremented periodically with the average arrival rate. This token count has a maximum limit, similar to the "credit line" in the bank credit account. The number of permissible transmitted cells in a burst (namely, continuous transmission at its peak bit rate) cannot exceed this predetermined value, i.e., maximum burst length. When there is no token, the newly arriving cell will be discarded, tagged, or delayed. Besides the constraint on the burst length, the peak bit rate of each virtual channel (VC) must also be limited.

In this example, it is assumed that the average rate to be 30Mbit/s on a 150M/bit/s channel, equivalent to the average arrival interval of 5 cells. Tokens are thus generated every 5 cell time slots as shown in FIG. 2. The peak bit rate is assumed to be 75Mbit/s, or the minimum departure interval (MI) is 2 cells. The number of tokens for the VC is initially assigned the maximum burst length (3). Let us also assume that 6 cells, a through f, arrive at time slots 6, 7, 8, 10, 12, and 14, respectively. When cell a arrives, the token count is 3, and is then decremented to 2 after cell a is immediately sent out. Since cell b arrives at time slot 7 and violates the minimum departure interval (2), it will be discarded, tagged (the shaded box in FIG. 2), or delayed by one cell time slot and sent out at time slot 8. When cell f arrives at time slot 14, there are no more tokens left. Therefore, it is either discarded, tagged, or delayed until a token is generated at time slot 20. The basic idea of performing credit management is to keep a real-time clock and assign a departure time (DT) to every arrived cell based on its current token count. The algorithm of assigning a DT to every arrived cell according to each VC's traffic descriptor (average and peak bit rate, and maximum burst length) can be found in the patent application mentioned above entitled "Method and System for Controlling User Traffic to a Fast Packet Switching System."

Figure 3:
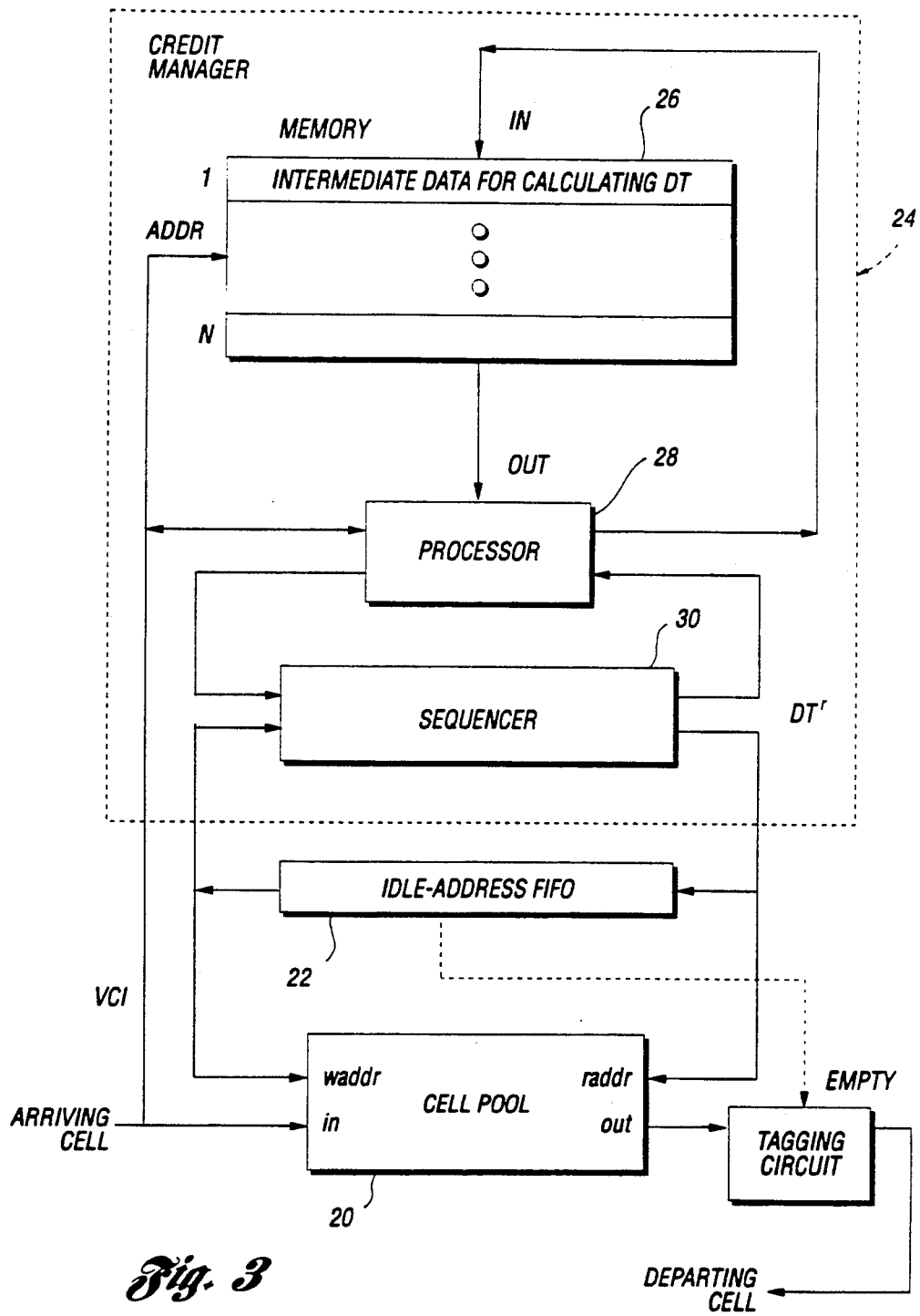
FIG. 3 is a block diagram illustrating a traffic enforcer's architecture.

FIG. 3 shows an architecture or system to implement the traffic enforcer/shaper. The system includes a cell pool 20, an idle-address FIFO 22, and a credit manager 24, which, in turn, includes a memory 26, a processor 28, and a sequencer 30. The processor 28 executes the algorithm by assigning DTs to arrived cells. Upon a cell's arrival, if the cell pool 20 is not full, the cell is stored in the cell pool 20 with a writing address given by the idle-address FIFO 22, which contains the addresses of current empty cell locations in the cell pool 20. If the cell pool 20 is full (i.e., the idle-address FIFO 22 is empty), the address field of the right-end entry of the sequencer 30 (see below) is used to read out the corresponding cell in the cell pool 20, whether or not its departure is due. The affected cell is then tagged and transmitted to the network. The vacant cell location will then be filled by the newly arrived cell. To avoid a malicious user queuing up too many violating cells in the cell pool 20, the number of backlogged cells for each VC is monitored. If the number exceeds a predetermined value, a warning message is sent back to this connection's source to slow down its traffic flow, or its following cells are simply discarded.

Before a cell is written into the cell pool 20, its virtual channel identifier (VCI) is first extracted by the processor 28 in order to access the corresponding intermediate data stored in the memory 26 (with N entries for N VCs) to calculate the arriving cell's DT. The cells' departure times are stored with the cells' addresses in the sequencer 30 in descending order (the smaller value is on the right of the larger one). As the real-time clock ticks, the smallest value of the DT (at the right end of the sequencer, $DT^n$) is compared to the real-time value. If the $DT^n$ is equal to (or less than) the real-time, meaning that the departure is due (or over-due), its corresponding cell stored in the cell pool 20 is accessed and sent out. In the meantime, the address of the available vacant location is written back to the idle-address FIFO 22 for the next arriving cell. The architecture is not restricted by the number of virtual channels (N) on the input line, nor by the size of the cell pool 20, because the processor 28 will only assign a departure time to the cell when it arrives. With the assistance of the sequencer 30, the processor 28 only needs to check the departure time once in each cell time slot (2.83 μs).

Each entry in the sequencer 30 has two values: the cell's DT and the cell's physical address (A) in the cell pool 20. The operation of the sequencer 30 is illustrated in FIG. 4. Assume that the value of $DT_n$ is less than that of $DT_{n+1}$. When a new cell with departure time $DT_n$ arrives, all pairs on the right of $A_k$, including the $A_k$ itself, remain at their positions while others are shifted to the left, and the vacant position is inserted with the pair of the new cell's departure time ($DT_n$) and address ($A_n$).

Queue Manager

By assigning a departure sequence number (DS) to every cell based on its average arrival rate (AR), which could be negotiated at the call setup, one can provide fairness among all virtual channels and set up resource firewalls to prevent interference among them. The queue manager always serves the cell that has the smallest value of the DS first. The DS assignment algorithm that is based on the VirtualClock concept is depicted below:

1. Upon the arrival of the first cell of connection, i, its $DS_i$=real-time, where real-time can be the value of a counter incremented per cell time (2.83 μs).
2. Upon receiving every cell from connection i, its $DS_i$=maximum (real-time, $DS_i + 1/AR_i$).

Figure 5A:
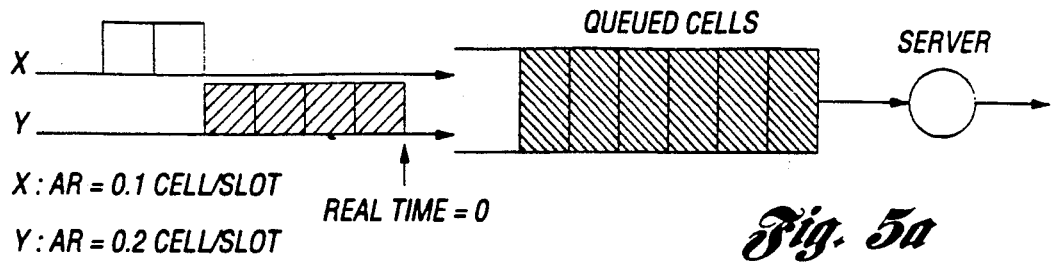
FIGS. 5a, 5b and 5c are schematic block diagrams illustrating how departure sequence numbers (DSs) are assigned to arrival cells.
Figure 5B:
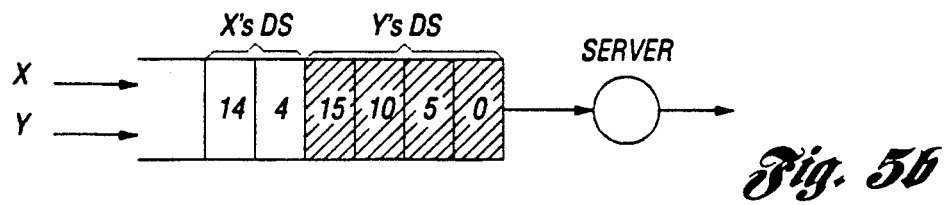
Figure 5C:
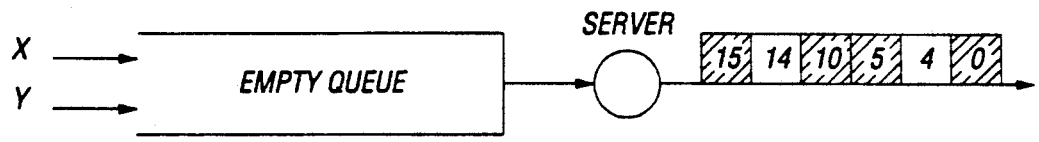

FIG. 5 shows an example of assigning the DS to the arrived cells and achieving the fairness. Assume that the input X's AR=0.1 cell/time slot, and the input Y's AR=0.2 cell/time slot. Initially, the real-time is reset to zero. Immediately following the reset, four consecutive cells arrive from input Y, and then two consecutive cells arrive from input X, as shown in FIG. 5(a). The DS of the first cell from the Y input is assigned the real-time's value (zero), and the cells that follow are assigned the values 5, 10, and 15, respectively. When the first cell of the X input arrives, the real-time value is 4, which is then assigned to the cell. For the X's second cell, its DS is set to maximum {5,4+10}, or 14. FIG. 5(b) shows the DSs of all six arrived cells. Based on these DS values, the server transmits cells with smaller values sequentially, as shown in FIG. 5(c).

Figure 6:
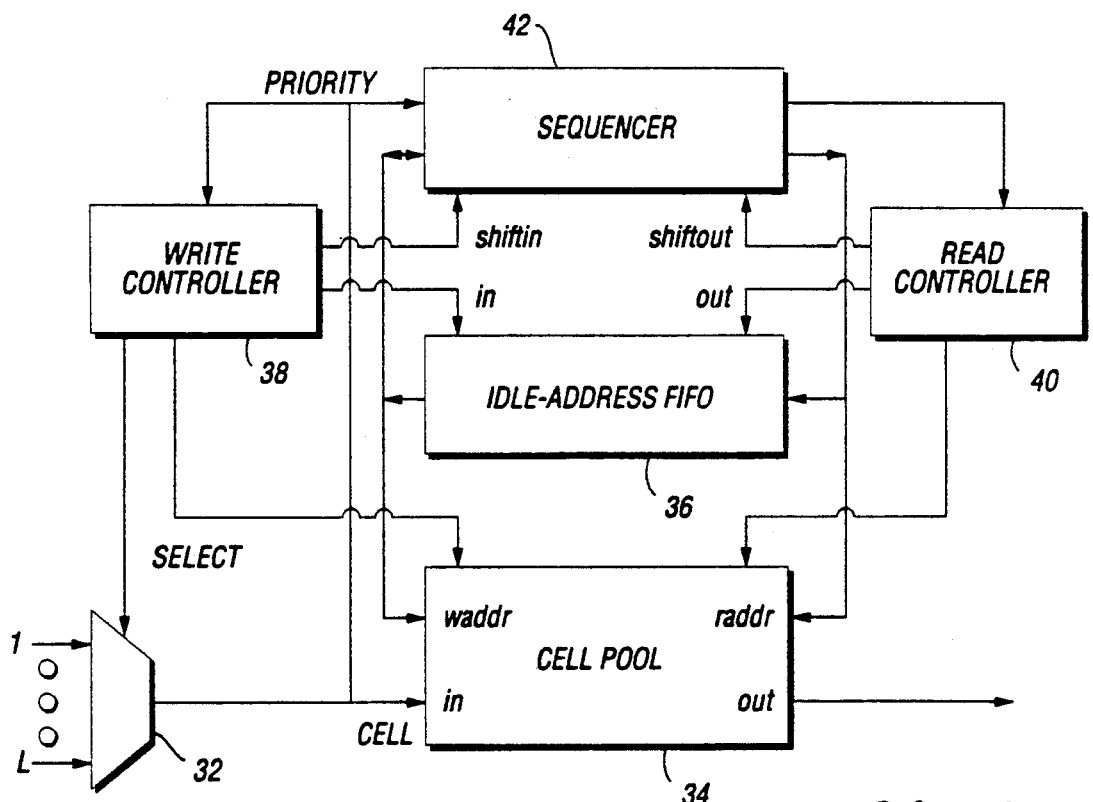
FIG. 6 is a block diagram illustrating the queue manager's architecture.

FIG. 6 shows an architecture to implement the queue manager. Cells from L inputs are time-division multiplexed first by a multiplexer 32 and then written into a cell pool 34 at idle addresses retrieved from an idle-address FIFO 36 (only valid cells are stored in the cell pool 34). L is the number of cells that are routed through an ATM switch network and arrive simultaneously at an output port (as shown in FIG. 1). With uncorrelated traffic from input ports uniformly directed to all output ports, the probability of more than 12 cells destined for any particular output port in each cell time interval is very low (e.g., $10^{-10}$).

Write/read controllers 38 and 40, respectively, generate proper control signals for all other functional blocks. A pair composed of a cell's DS and such a way that smaller DSs are always at the right of larger DSs. Therefore, cells With smaller DSs will be accessed earlier by the read controller 40. Once the pair has been accessed, the address is used to read out the corresponding cell in the cell pool 34, and the address of the available vacant location is written back to the idle-address FIFO 36. For traffic that has different service classes, the priority field of each cell can be constructed from the combination of the service class and the DS. The priority field in the cells that are routed in the internal ATM switch network can be arranged by cascading the service-class bits (most-significant bits) and the DS (least-significant bits). Consequently, the sequencer 42 will sort the cells' priority levels rather than the DSs.

When the cell pool 34 is full (i.e., the idle-address FIFO 36 is empty), the priority field at the left-most position of the sequencer 42 (e.g., $P_z$) is compared to that of the newly arrived cell ($P_n$). If $P_n$ is smaller than $P_z$, the pair of $P_z$ and $A_z$ is pushed away from the sequencer 42 as the new pair ($P_n$ and $A_n$) is inserted in the sequencer 42. Meanwhile, the cell with address $A_z$ in the cell pool 34 is overwritten with the new cell. However, if $P_n \geq P_z$, the new cell is discarded instead.

Sequencer Chip Implementation

This section describes the implementation of a general purpose sequencer chip device which performs the functions of the sequencers 30 and 42. The major building blocks of the sequencer chip device, such as a subtractor and a register are designed to reduce the area of the device and the power consumed by the device. A chip summary and the testing results are also given.

Basic Functions

Figure 7:
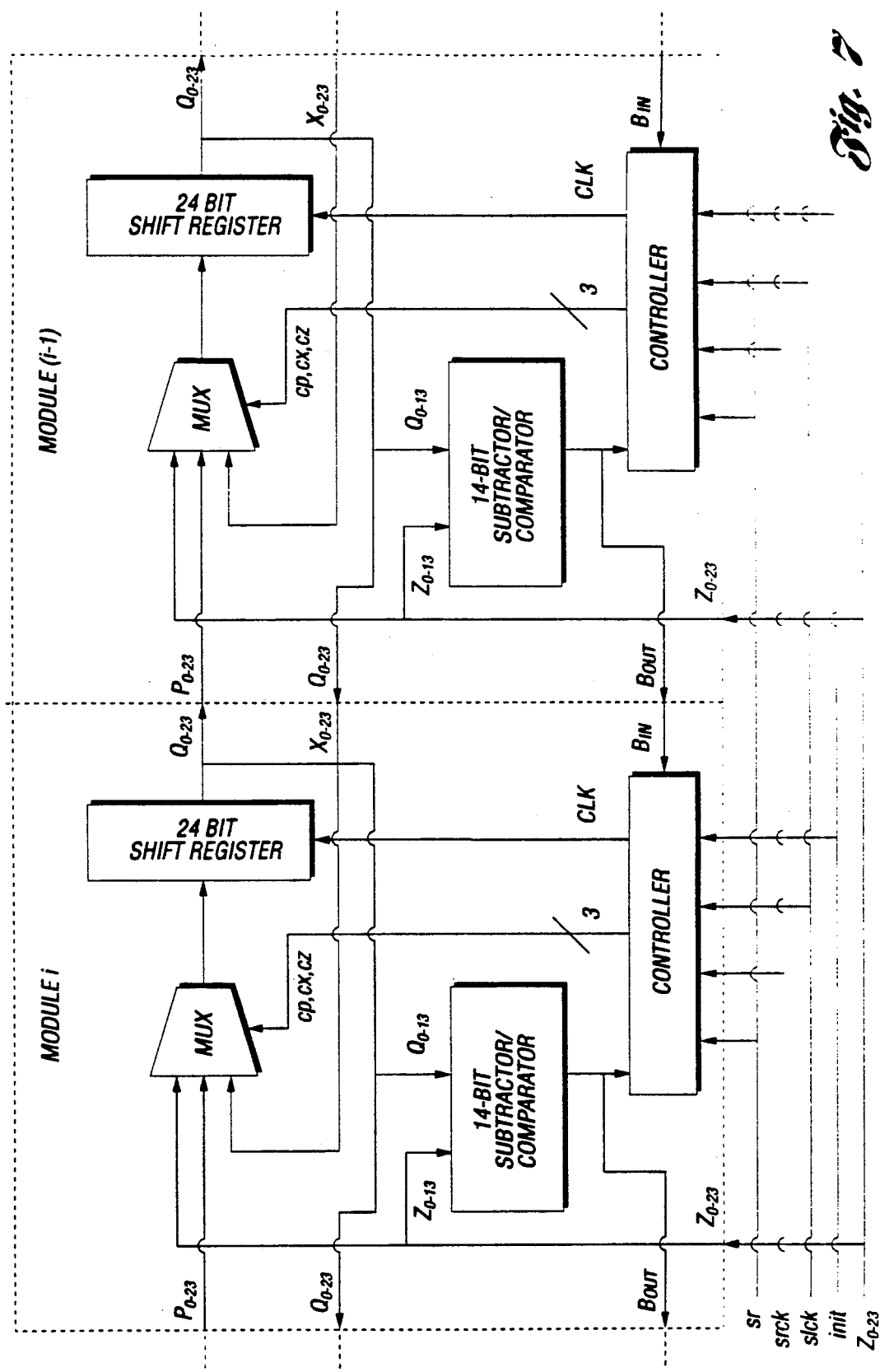
FIG. 7 is a block diagram of the sequencer ship device.

Both the traffic enforcer's architecture (FIG. 3) and the queue manager's architecture (FIG. 6) require the sequencers 30 and 42 to sort the cells' DTs or DSs in descending order. The sequencers 30 and 42 are preferably implemented with a VLSI chip, which is essentially a 256-word sorting-memory chip. Due to general sorting function, it can also be used for other scheduling algorithms and priority assignment procedures. FIG. 7 shows the building block of the chip, where the circuit in the dashed box is a module and is repeated 256 times in the chip. Each module has a 24-bit register which stores the 14-bit DT/DS values and the 10-bit address. A single chip can accumulate a cell pool capacity of 256 cells and DT/DS values (or the number of priority levels in some applications) up to $2^{14}-1$. By cascading more sequencer chips, a larger cell pool (e.g., a few thousand cells) or a larger DT/DS value can be supported.

When a new pair of the DT/DS and the address field, denoted by $Z_{0-23}$, is to be inserted into the sequencer, it is first broadcast to every one of the identical modules. By comparing the DT/DS values ($Q_{0-13}$) of Module (i-1) and Module i, and the new broadcast value ($Z_{0-13}$), the controller generates proper signals, cp, cx, cz and clk, to shift the broadcast value ($Z_{0-23}$) into the 24-bit register in Module i, shift Module (i-1)'s $Q_{0-23}$ to the register, or retain the register's original value. Table 1 lists these three possible actions performed by the controller, where $X_{0-13}$ is the Module (i-1)'s $Q_{0-13}$.

TABLE 1

| Three Possible Actions Performed By The Controller | | | |
|---|---|---|---|
| CASES | $b_{out}$ | $b_{in}$ | Action Performed by the Controller |
| (a) $X_{0-13} \leq Z_{0-13} < Q_{0-13}$ | 1 | 0 | Module i shifts its content to the left, and $Q_{0-23} = Z_{0-23}$ |
| (b) $Z_{0-13} < X_{0-13} \leq Q_{0-13}$ | 1 | 1 | Both Modules i |

TABLE 1-continued

Three Possible Actions Performed By The Controller

| CASES | $b_{out}$ | $b_{in}$ | Action Performed by the Controller |
|---|---|---|---|
| (c) $X_{0-13} \leq Q_{0-13} \leq Z_{0-13}$ | 0 | 0 | and (i-1) shift their contents left, and $Q_{0-23} = X_{0-23}$ Retain the $Q_{0-23}$ |

The $b_{out}$ is the borrow-out of ($Z_{0-13}-Q_{0-13}$), and the $b_{in}$ is the borrow-out of ($Z_{0-13}-Z_{0-13}$). Since the smaller DT/DS is always on the right of the larger one, the case where $Q_{0-13} \leq Z_{0-13} < X_{0-13}$, or $b_{out}\, b_{in}=01$, will not happen.

When a cell with the smallest DT/DS value is to be transmitted, it corresponding address will be shifted out from the sequencer chip, and the data of all registers will be shifted one position to the right. For instance, the $Q_{0-23}$ in Module i will be shifted to the register in Module (i-1).

Figure 8:
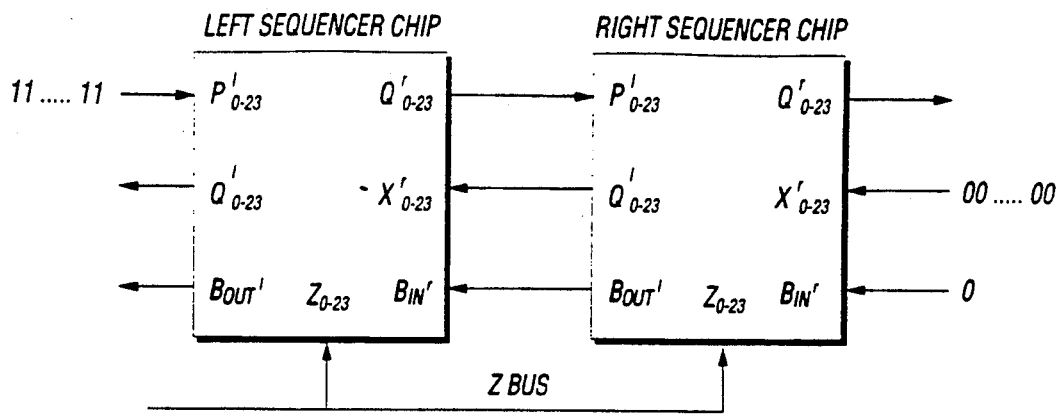
FIG. 8 is a block diagram schematically illustrating the interconnection signals of two cascaded sequencer chip devices.

FIG. 8 shows the connection of signals between two cascaded Sequencer chips. The $P^l_{0-23}$ of the left sequencer chip is connected to all 1s; $X^r_{0-23}$ and $b^l_{in}$ of the right sequencer chip are all connected to 0s. The superscript of l and r indicate, respectively, the module at the most left and the most right of the chip. At the initialization, all the registers inside the chip are loaded with the largest DT/DS values, i.e., all 1s, so that new arrival cells with DT/DS values between 0 and $2^{14}$-1 can be inserted into the chip. The initialization is done by asserting the init and srck signals and setting $Z_{0-23}$ to 11 . . . 11, which is the initialization mode in FIG. 9.

Figure 9:
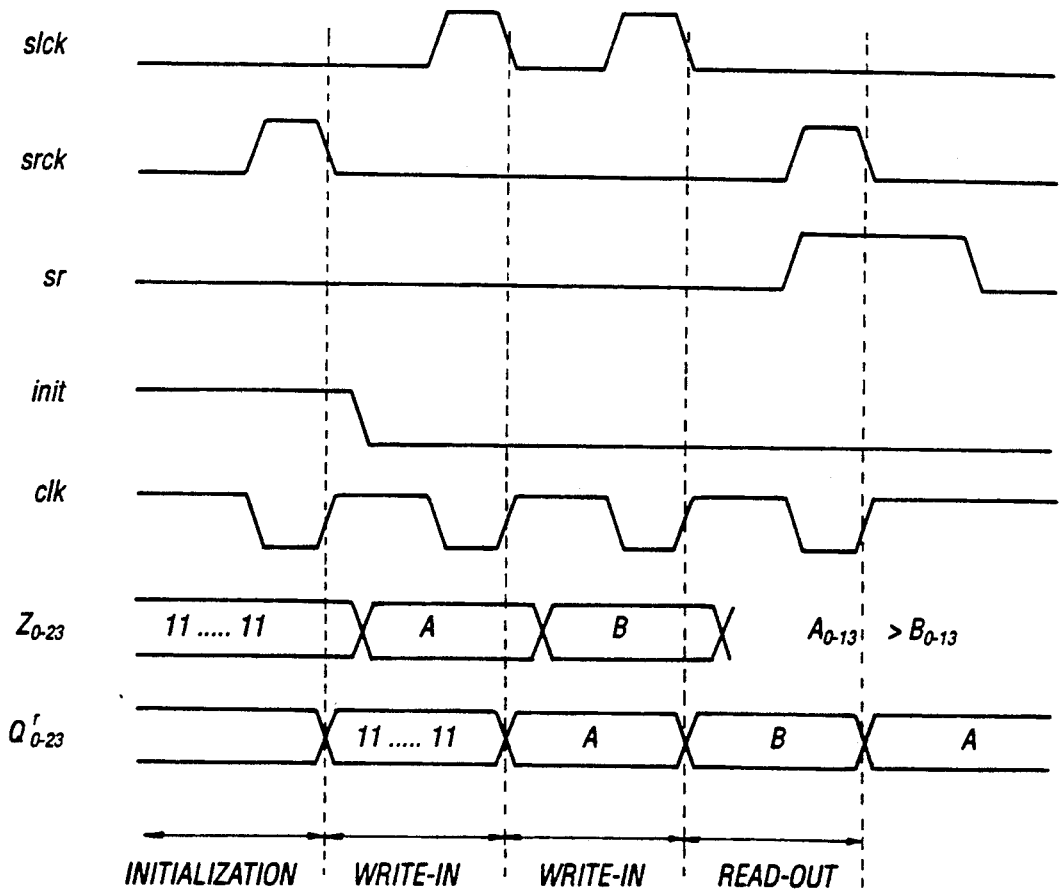
FIG. 9 are timing diagrams of initialization, write-in, and read-out operations of the device.

FIG. 9 also shows that two values, $A_{0-23}$ and $B_{0-23}$, are written into the chip by asserting the slck signal (write-in mode). They appear at the $Q^r_{0-23}$ output of the right chip. If it is assumed that $A_{0-13} > B_{0-13}$, B will be read out before A. The read-out mode is operated by asserting the srck and sr signals simultaneously. The shifting clock's period is equal to one cell time (2.83 $\mu$s) divided by the number of total inputs and outputs is 13 (for the queue manager application), the clock period will be about 220 ns. So, the chip's required operation frequency is less than 5 MHz. The operation speed for the traffic enforcer/shaper and queue manager is not affected by the number of cells in the cell pool, nor by the possible values of DT/DS (or priority levels) due to the broadcast mechanism and the distributed processing.

The logic equations of each of the controllers are listed below, and its detailed circuit is shown in FIG. 10.

$cp=sr; cx=\overline{sr \cdot b_{in} \cdot init};$ $cz=\overline{sr \cdot (b_{in}+init)};$ $clk=\overline{(b_{out} \cdot slck) \cdot srck}$ Several buffers are required to provide enough driving capability for the large fanout of the control signals. The nx (n=2,3,6, or 16) in FIG. 10 represents the associated gate widths as n times that of the smallest gate. A pulse is generated on the clk signal when the chip is in the initialization mode (both srck and init are asserted), in the write-in mode (slck is asserted and either case (a) or (b) in Table 1 occurs), or in the read-out mode (both srck and sr are asserted). The register is clocked at the falling edge of the slck or srck signals. If it is clocked at the rising edge (i.e., clk=$b_{out} \cdot$slck+srck), the $b_{out}$ may change again after the register has been loaded with a new DT/DS value. This may cause undesired transitions on the clk signal during the write-in mode, and a wrong value may be latched into the register.

Subtractor

Each of the subtractors of FIG. 7 is preferably a 14-bit subtractor, consisting of 15 full-subtractors cascaded in series. Each subtractor is designed to minimize the number of transistors. FIG. 11 shows the detailed circuit and lists the logic equations for the full-subtractor. Since only the borrow-out is needed in the present application, the circuit for generating the difference is omitted and is not shown in the circuit diagram. The exclusive-or function is implemented with six transistors. To avoid a long chain of pass transistors, the borrow-out at every stage is inverted. If the full-subtractor of the least-significant bit is named an even one, and the next one as an odd one, the 14-bit subtractor then consists of even and odd subtractors alternately and repeatedly. Through a simulation, the maximum delay for the 14-bit subtractor was found to be 12 ns, which occurs when the least-significant bit changes from high to lower or low to high.

Register

The 24-bit register in each module is preferably implemented with static, rather than dynamic, D-type flip-flops (DFFs) because the chip is operated in an asynchronous manner where, during idle slots cells, there are no write operations for the chip. When one designs a DFF, several considerations need to be taken into account, such as speed, area, power consumption, race problem, and noise margin. In the present application, speed is not a concern because the operating speed is relatively low (less than 40 MHz). Instead, area and power consumption are important because there are preferably more than six thousand DFFs (24×256) in the chip. A single-phase clocking scheme is adopted for the DFF to eliminate the race problem.

In FIGS. 12a–12c, there are illustrated three different static DFFs which are compared with respect to their area, power consumption, noise margin, and speed. The comparison of dynamic DFFs on their speed and robustness against the race problem can be found in the paper entitled "High-Speed CMOS Circuit Technique" by H. J. Chao and C. A. Johnson, IEEE J. SOLID-STATE CIRCUITS, Vol. 24, No. 5, pp. 1454–1458, Oct. 1989. DFF1, shown in FIG. 12(a), was proposed in the paper entitled "Novel Switched Logic CMOS Latch Building Block" by L. Spaanenburg et al., ELECTRONIC LETTERS, Vol. 21, pp. 398–300, Apr. 1985.

DFF2 shown in FIG. 12(b), has 4 inverters and 4 transmission gates, and is commonly used. DFF2 uses a two-phase clock scheme (ck and $\overline{ck}$ signals) and may cause the race problem if the overlap between ck and $\overline{ck}$ is large. This normally occurs when clock signals are distributed in the entire chip and drive large capacitance loads.

DFF3, shown in FIG. 12(c), is adopted in the present chip. It is similar to DFF2 except that the transmission gates are replaced with pass transistors, and a single-phase clock is used. Table 2 summaries the properties of each DFF, obtained from simulations with 1.2 $\mu$m CMOS typical parameters.

TABLE 2

| DESIGN | Area ($\mu m^2$) | Power (mW) @ 100 MHz | Noise Margin | Speed Figure (ns) |
|---|---|---|---|---|
| DFF1 | 1848 | 1.48 | 0.8 | 2.1 |
| DFF2 | 3465 | 0.88 | 2.5 | 2.0 |
| DFF3 | 1800 | 0.75 | 0.9 | 2.1 |

Although DFF2 has the largest noise margin and the highest speed, DFF3 has the smallest area and power consumption, making it the most appropriate choice for the chip. The area of DFF2 is almost twice that of DFF3. The power consumption of DFF1 is almost twice that of DFF3. This is because DFF1s clock signal (ck) is connected to two more transistor's drains, which causes some current flowing to vss during the transient periods and thus wastes the power.

Noise margins are measured in the worst case at DFF's internal pints, by the absolute difference between the node voltage and an inverter's threshold voltage (2.5 V). For instance, the highest voltage for logic 0 in DFF3 is at node w (see FIG. 12(c)) and the value is 1.6 V, while the lowest voltage for logic occurs at node y and the value is 3.5 V. Thus, the noise margin is equal to minimum {1.6-2.5, 3.5-2.5}, or 0.9 V.

Referring now to FIG. 7 in Combination with FIG. 12c, the multiplexer or MUX in front of the 24-bit register is a collection of simple N-transistors controlled by cp, cx, and cz signals. Cascading the N-transistor with the P-transistor in the DFF does not affect the logic 0's noise margin at node w, but it does cause the voltage for logic 1 at node w to drop below 5 V. However, this voltage level is still greater than that at node y, so the logic 1's noise margin is not affected by cascading the N- and P-transistors. In each module, a 3.7-pF by-pass capacitor between vdd and vss reduces the ripple voltage on the power rails (caused by the inductance between vdd and vss), compensating for the smaller noise margin in DFF3.

The speed figure of a DFF is determined by the sum of a DFF's delay time ($t_d$) and setup time ($t_s$). A way of determining a DFF's speed figure is shown in FIG. 13. A divide-by-two counter is formed by feeding a DFF output q to an odd number inverter chain (9 in the example) and back to the DFF input. The frequency of the ck signal is increased to where the divide-by-two function fails, which corresponds to the testing circuit's maximum operating frequency. To have a correct operation in a synchronous system, the following condition must be satisfied:

$$T \geq t_d + \tau + t_s,$$

where T is the clock signal's period and $\tau$ is the propagation time of a circuit between two DFFs. Since the divide-by-two circuit is simulated up to the clock signal's maximum frequency, the equality in the above equation holds. A ring oscillator consisting of a 9-inverter chain was simulated and $\tau$ was found to be 1.5 ns, half of the ring oscillator's period. By subtracting the 9 inverters' delay ($\tau$) from the T in the above equation, the speed figure of each DFF can be obtained.

Chip Summary and Testing

The chip was laid out with a custom symbolic layout tool (called DASL). It has 182 pads and is packaged in a 223-pin ceramic pin grid array (PGA) carrier. It has low bonding-wire inductance due to a ground plane on the chip carrier and thus reduces the ripple voltage on the power rails inside the chip. The chip's die size is preferably about 7.5 mm×8.3 mm. The chip was simulated at circuit level to operate at a clock rate of 50 MHz. The circuit-level simulation tool adopts a table look-up approach to calculate the voltages and currents of internal nodes inside the chip, rather than solving nonlinear equations such as in a simulation program. Therefore, the tool can simulate very complex chips, such as the chip that preferably contains about 150k CMOS transistors, in a reasonable amount of time. For instance, it took about 3 days to run 20 test events (1,600 ns) for the chip simulation on a 27-MIPS workstation.

The chip was tested in three different ways: P-test X-test, and Z-test, depending on where test vectors were loaded into the chip. The P-test (shifting data to the right) and the X-test (shifting data to the left) determines if there is any bit stuck at logic 0 or 1. Because of the modular structure of the chip, the outputs shifted out of the chip can be monitored and it can be determined which module inside the chip causes errors. These preliminary tests can identify bad chips quickly. For those chips passing the P- and X-tests, the chips can be further tested by entering test vectors through the Z bus and operating the chips at three different modes: initialization, write-in, and read-out. The time period needed for initialization, read-out, or write-in can be denoted as a clock cycle.

For the P-test, the chip is first loaded with 24 words from $P^l_{0-23}$ input by asserting the srck and sr signals (read-out mode). The value of the Z bus can be arbitrary. These words all have 23 bits of logic 1 and 1 bit of 0; the 0 bit appears diagonally in the 24 words. After 232, or 256-24, clock cycles, the first-loaded word appear at the $Q^r_{0-23}$ output. If a certain bit in a module, say Module k (Module 1 is on the most right), is stuck at 0, the output of that bit stays zero after k clock cycles. To detect stuck-to-1 errors, all modules have to be initialized to all 0s instead of to all 1s before the same tests are applied.

For the X-test, the same 24 words are loaded to the chip from $X^r_{0-23}$ input by asserting by slck signal (write-in mode), setting the $b^r_{in}$ logic to 1, and applying all 0s to the Z bus. As these 24 words are shifted to the left, their vacant positions are filled with all 0 values. Any stuck-at-0 error in Module k causes that bit position to stay 0 at the output $Q^l_{0-23}$ after (256−k) clock cycles. However, since the chip cannot be initialized to all 0s in this test, the stuck-at-1 error can be detected, but cannot be located.

For the Z-test, mixed-order numbers are written into the chip through the Z-bus after the initialization. These numbers are then read-out serially and examined to see if they are in an ascending order. For those test vectors that have the same DS/DT value, the ones written earlier will be read-out earlier.

Chips were tested and operated correctly up to 33 MHz, limited by the pattern generator's speed. This speed provides a sufficient operation margin for normal applications (about 5 MHz). The delay of the output is 10 ns from the falling edge of the srck or slck signal. The setup time for the inputs is 15 ns before the rising edge of the srck or slck signal. The holding time is 1 ns after the falling edge. The worst case of the chip power dissipation is about 2.3 W, when the chip is clocked at 33 MHz in the initialization mode, and the values of all 0s and all 1s are alternated on the Z bus at this rate. This causes all 6,144 DFFs to toggle simultaneously at this rate.

Conclusions

User's traffic can be controlled at two places in a B-ISDN network: at the user-network interface (UNI) by a traffic enforcer, and at the network-node interface (NNI) by a queue manager. The users' traffic must first be enforced to conform to a traffic descriptor, which may include the parameters such as average and peak bit rates, and maximum burst lengths. If the users' traffic does not comply with the traffic descriptor, some action has to be taken against the violating traffic.

There is described herein an enforcement strategy for the traffic enforcer by providing a buffer to delay and reshape the violating cells. If the buffer is full, cells are transmitted to the network but are tagged with a lower priority. Once users' cells are allowed to enter the network either with or without reshaping, they may be queued up in the buffers between network nodes.

A queue manager is required to manage the queued cells in such a way that higher priority cells are always served first, low priority cells are discarded when the queue is full, and any interference between same-priority cells is prevented. By assigning a departure sequence number to every arrived cell based on its average arrival rate agreed upon at the call setup, the queue manager can easily and effectively perform the queue management function.

Both implementation architectures for the traffic enforcer (or shaper) and the queue manager apply the concepts of fully distributed and highly parallel processing to schedule the sending or discarding sequence of ATM cells. To support these two architectures, a VLSI chip (called a sequencer chip), which preferably contains about 150k CMOS transistors, has been implemented with 1.2-$\mu$m CMOS technology in a regular structure so that the number of virtual channels or priority levels can grow flexibly. The sequencer chip has been tested and operated correctly up to 33 MHz, providing a sufficient operation margin for normal applications (about 5 MHz).

While the best mode for carrying out the invention has been described in detail, those familiar with the art to which this invention relates will recognize various alternative designs and embodiments for practicing the invention as defined by the following claims.

What is claimed is:

1. A sequencer chip device for use in a broadband integrated service digital network wherein users' traffic in the form of asynchronous transfer mode (ATM) cells is scheduled, the sequencer chip device comprising:

a plurality of modules connected in series for receiving priority data related to the ATM cells; and means for broadcasting new priority data related to a newly arrived ATM cell to each of the modules in a write-in mode of the sequencer chip device, wherein each of the modules includes:

memory means for storing prior priority data related to a previously received ATM cell;

means for comparing the new priority data with the prior priority data to obtain a comparison signal; and controller means coupled to its respective memory means and means for comparing for alternately retaining said stored prior priority data or replacing said stored prior priority data with the new priority data or with prior priority data from an immediately adjacent memory means based on the comparison signal of its means for comparing and the comparison signal of the immediately adjacent means for comparing wherein high-speed sorting of the ATM cells is achieved.

2. The device as claimed in claim 1 wherein the device is a single VLSI chip.

3. The device as claimed in claim 2 wherein the chip is a word sorting memory chip.

4. The device as claimed in claim 1 wherein each of the memory means includes a shift register and wherein the stored prior priority data is shifted out of the shift register.

5. The device as claimed in claim 4 wherein the shift register includes a plurality of static D-type flip-flops.

6. The device as claimed in claim 5 wherein each of the flip-flops includes a plurality of interconnected inverters and transistors adapted to receive a single phase clock signal.

7. The device as claimed in claim 1 further comprising means for initializing each of the memory means in an initialization mode of the chip.

8. The device as claimed in claim 1 wherein each of the means for comparing is a subtraction circuit.

9. The device as claimed in claim 8 wherein each of the subtraction circuits includes a plurality of full subtraction circuits cascaded in series.

10. The device as claimed in claim 9 wherein the plurality of full subtraction circuits comprises even and odd subtractor circuits.

11. The device as claimed in claim 1 wherein each of the modules further includes multiplexer means coupled to the memory means for multiplexing the priority data of a plurality of ATM cells to the memory means based on a control signal from the controller means.

* * * * *